US008338550B2

(12) United States Patent
Khosravi et al.

(10) Patent No.: US 8,338,550 B2
(45) Date of Patent: Dec. 25, 2012

(54) OLEFIN METATHESIS POLYMERISATION

(75) Inventors: Ezat Khosravi, Durham (GB); Alan M. Kenwright, Durham (GB); Zhanru Yu, Oxford (GB); David M. Haigh, Oxfordshire (GB); Lois Hobson, Teesside (GB)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/186,897

(22) Filed: Jul. 20, 2011

(65) Prior Publication Data

US 2012/0022225 A1 Jan. 26, 2012

Related U.S. Application Data

(63) Continuation of application No. PCT/EP2009/050658, filed on Jan. 21, 2009.

(51) Int. Cl.
*C08G 61/08* (2006.01)
*C08F 8/02* (2006.01)
*C08F 4/80* (2006.01)

(52) U.S. Cl. ........ 526/147; 526/135; 526/171; 525/269; 525/312; 585/645; 585/904

(58) Field of Classification Search .................. 526/135, 526/147, 171; 585/645, 904; 525/269, 312
See application file for complete search history.

(56) References Cited

U.S. PATENT DOCUMENTS

| 6,486,263 | B2 | 11/2002 | Fogg et al. | |
|---|---|---|---|---|
| 6,610,626 | B2 * | 8/2003 | Grubbs et al. | 502/155 |
| 6,818,586 | B2 * | 11/2004 | Grubbs et al. | 502/155 |
| 2002/0107138 | A1 | 8/2002 | Hoveyda et al. | |
| 2003/0064884 | A1 | 4/2003 | Yao | |
| 2004/0019212 | A1 | 1/2004 | Hoveyda et al. | |
| 2006/0235235 | A1 | 10/2006 | Emrick et al. | |

FOREIGN PATENT DOCUMENTS

| WO | 0214376 A2 | 2/2002 |
|---|---|---|
| WO | 03011455 A1 | 2/2003 |
| WO | 2006067370 A1 | 6/2006 |

OTHER PUBLICATIONS

Rouhi, A. Maureen et al. "Olefin Metathesis: Big-Deal Reaction," Chemical & Engineering News, vol. 80, No. 51, Dec. 23, 2002, pp. 29-33, Retrieved from http://pubs.acs.org/cen/coverstory/8051/print/8051olefin on Apr. 14, 2011.
Schrodi, Yann et al. "Second-Generation Ruthenium Olefin Metathesis Catalysts," Aldrichimica ACTA, vol. 40, No. 2, 2007, pp. 45-52.
Slugovc, Christian, et al. "Influence of functional groups on ring opening metathesis polymerization and polymer properties," Journal of Molecular Catalysis A: Chemical, Elsevier, vol. 213, 2004, pp. 107-113.
Buchmeiser, Michael R. "Recent advances in the synthesis of supported catalysts," New Journal of Chemistry, vol. 28, Apr. 8, 2004, pp. 549-557, Retrieved from http://pubs.rsc.org on Apr. 6, 2011.
Morgan, John P. et al. "In Situ Preparation of a Highly Active N-Heterocyclic Carbene-Coordinated Olefin Metathesis Catalyst," Organic Letters, vol. 2, No. 20, 2000, pp. 3153-3155.
Garber, Steven B. et al. "Efficient and Recyclable Monomeric and Dendritic Ru-Based Metathesis Catalysts," Journal of American Chemical Society, vol. 122, No. 34, Aug. 12, 2000, pp. 8168-8179.
Bielawski, Christopher W. et al. "Highly Efficient Ring-Opening Metathesis Polymerization (ROMP) Using New Ruthenium Catalysts Containing N-Heterocyclic Carbene Ligands," Angew. Chem. Int. Ed., Wiley-Vch Verlag GmbH, vol. 39, No. 16, 2000, pp. 2903-2906.
Sanford, Melanie S. et al. "A Versatile Precursor for the Synthesis of New Ruthenium Olefin Metathesis Catalysts," Organometallics, American Chemical Society, vol. 20, Nov. 3, 2001, pp. 5314-5318.
Choi, Tae-Lim et al. "Controlled Living Ring-Opening-Metathesis Polymerization by a Fast-Initiating Ruthenium Catalyst," Angew. Chem. Int. Ed., Wiley-Vich Verlag GmbH, vol. 42, 2003, pp. 1743-1746.
Ulman, Michael et al. "Relative Reaction Rates of Olefin Substrates with Ruthenium (II) Carbene Metathesis Initiators," Organometallics, American Chemical Society, Nov. 19, 1997, pp. 2484-2489.
Conrad, Jay C. et al. "The First Highly Active, Halide-Free Ruthenium Catalyst for Olefin Metathesis," Organometallics, American Chemical Society, vol. 22, No. 18, Aug. 6, 2003, pp. 3634-3636.
Crowe, W. E. et al. "Chain-Transfer Agents for Living Ring-Opening Metathesis Polymerization Reactions of Norbornene," Macromolecules, American Chemical Society, vol. 23, No. 14, 1990, pp. 3534-3536. Schrock, Richard R. "Living Ring-Opening Metathesis Polymerization Catalyzed by Well-Characterized Transition-Metal Alkylidene Complexes," Acc. Chem. Res., American Chemical Society, vol. 23, 1990, pp. 158-165.
Kingsbury, Jason S. et al. "A Recyclable Ru-Based Metathesis Catalyst," J. Am. Chem. Soc., American Chemical Society, vol. 121, Jan. 15, 1999, pp. 791-799.

* cited by examiner

*Primary Examiner* — Fred M Teskin
(74) *Attorney, Agent, or Firm* — Jane E. Gennaro

(57) ABSTRACT

A ring-opening metathesis polymerization (ROMP) reaction is disclosed in which a cyclic alkene compound is subjected to ROMP using a ruthenium ROMP catalyst having heterocyclic ligands in the presence of a compound from which such ligands may be derived. The process includes the step of adding sufficient of an acyclic alkene having a carbon-carbon double bond capable of reacting with the catalytic metal moieties attached to the living end of each of the polymer chains generated in the ROMP reaction to end cap the polymer chains and to generate a olefin metathesis catalyst. The process includes reiterating the polymerization steps by adding further amounts of a cyclic alkene compound. The catalyst may be generated in situ from a precursor compound by the addition of a compound from which heterocyclic ligands may be derived by interaction with the precursor compound.

7 Claims, No Drawings

OLEFIN METATHESIS POLYMERISATION

CROSS REFERENCE TO RELATED APPLICATION

The present application is a continuation of International Application No. PCT/EP2009/050658 filed 21 Jan. 2009, the contents of which are incorporated herein by reference.

The present invention relates to olefin metathesis polymerisation and, in particular, to ring-opening metathesis polymerisations (ROMP).

Olefin metathesis reactions concern the exchange of groups around double bonds between carbon atoms. The ability to perform olefin metathesis reactions is of significant commercial interest which interest has been increased in recent years owing to major developments in transition metal initiators and catalysts, especially metal carbene initiators and catalysts, for such reactions. Useful reviews are available such as that by A Maureen Rouhi of olefin metathesis in Chemical & Engineering News, Volume 80, Number 51, CENEAR 80 51 pp. 29-33, ISSN 0009-2347; that by Yann Schrodi and Richard L Pederson entitled "Evolution and Applications of Second-Generation Ruthenium Olefin Metathesis Catalysts" in Aldrichimica ACTA, Vol 40, No 2, 2007; and that by Christian Slugovc et al, "Influence of functional groups on ring opening metathesis polymerisation and polymer properties", Journal of Molecular Catalysis A: Chemical 213 (2004) 107-113.

In many metathesis reactions involving ring-closing metathesis (RCM), cross metathesis (CM) and asymmetric ring-opening/cross metathesis (AROM/CM), the transition metal compound or complex is recoverable in viable quantities. Examples of such catalysts are disclosed in "A Recyclable Ru-Based Metathesis Catalyst", Hoveyda et al, J Am Chem Soc, 1999, 121, 791-799; "Recent Advances in the Synthesis of Supported Metathesis Catalysts", Buchmeiser, New. J. Chem., 2004, 28, 549-557; US-A-2002/0107138—Hoveyda et al (equivalent to WO 02/014376); US-A-2003/0064884—Yao; US-A-2004/0019212—Hoveyda et al; "In Situ Preparation of a Highly Active N-Heterocyclic Carbene-Coordinated Olefin Metathesis Catalyst", Morgan & Grubbs, Organic Letters 2000, Vol 2, No 20, 3153-3155; "Efficient and Recyclable Monomeric and Dendritic Ru-Based Meathesis Catalysts", J Am Chem Soc, 2000, 122(34), 8168-8179, Garber et al; "Highly Efficient Ring-Opening Metathesis Polymerisation (ROMP) Using New Ruthenium Catalysts Containing N-Heterocyclic Carbene Ligands", Bielawski & Grubbs, Chem. Int. Ed 2000, 39, No 16, 2903-2907; "A Versatile Precursor for the Synthesis of New Ruthenium Olefin Metathesis Catalysts", Grubbs et al, Organometallics, 2001, 20, 5314-5318; "Controlled Living Ring-Opening-Metathesis Polymerisation by a Fast-Initiating Ruthenium Catalyst", Choi & Grubbs, Chem. Int. Ed 2003, 42, 1743-1746; "Relative Reaction Rates of Olefin Substrates with Ruthenium(II) Carbene Metathesis Initiators", Ulman & Grubbs, Organometallics, 1998, 17, 2484-2489; U.S. Pat. No. 6,486,263—Fogg et al; and "The First Highly Active, Halide-Free Ruthenium Catalyst for Olefin Metathesis", Conrad et al, Organometallics 2003, 22, 3634-3636. The mechanism of recovery of the catalyst appears to involve the recombination of the active transition metal with a carbene moiety that may have been displaced from the transition metal during the reaction. As the concentration of reactant(s) is lowered as the reaction nears completion, the carbene moiety reacts with the transition metal to reform a catalyst. The catalyst may then be separated from the reaction mixture by any suitable separation technique; for example by chromatography, precipitation and filtration (the latter technique is especially useful when the catalyst is a supported catalyst).

In contrast, when such catalysts are used in ROMP reactions, owing to the kinetics involved, the transition metal moiety catalysing the reaction usually remains attached to the ends of the resultant polymer chains. Consequently, it is necessary to cleave the transition metal moiety from the polymer. A number of reagents may be used to effect cleavage of the metal, a common example being ethyl vinyl ether (CH2=CHOCH2CH3) as described on page 6, [0062] of US-A 2003/0064884 referred to above. Such cleavage or end-capping agents may terminate the polymer chains or may be used to add in functionality to ends of the polymer chains. However, such methods leads to either a transition metal species which is metathesis inactive or to a transition metal species which is metathesis active but which is unstable and rapidly decomposes to one which is inactive.

It has also been proposed, see "Living Ring-Opening Metathesis Polymerization Catalyzed by Well-Characterized Transition Metal Alkylidene Complexes", Richard R Schrock, Acc. Chem. Res. 1990, 23, 158-165 and "Chain-Transfer Agents for Living Ring-Opening Metathesis Polymerization Reactions of Norbornene", W E Crowe, J P Mitchell, V C Gibson and R R Schrock, Macromolecules 1990, 23, 3534-3536, to use 1,3-pentadiene or styrene as chain-transfer agents for tungsten and molybdenum ROMP catalysts.

It has also been proposed (see WO-A-2006/067370) in such ROMP reactions to add an acyclic alkene having a carbon-carbon double bond capable of reacting with the catalytic metal moieties attached to the living end of each of the polymer chains to the reaction mixture after polymerisation has occurred to generate a stable olefin metathesis transition metal catalyst whether the same as the starting catalyst or different therefrom. Preferred acyclic alkenes include styrene and isopropoxy-styrene.

This technique was successful. However, the Applicants have found that, when applied to modified second generation Grubbs catalysts such as exemplified at 20, FIG. 5 of the Schrodi and Pederson reference mentioned above, although the catalyst could be regenerated effectively 100% using styrene, styrene has a destabilising effect on the catalyst resulting in its decomposition over time. The destabilising effect may be easily demonstrated by adding styrene to a solution of the catalyst in trichloromethane which results in decomposition of the catalyst over time.

The Applicants have found the surprisingly simple step of including with the catalyst in the polymerisation reaction a suitable ligand significantly improves the stability of such catalysts in the presence of such acyclic alkenes.

Thus, according to the present invention, a polymerisation process comprises:

a) subjecting at least one cyclic alkene compound to a ring-opening metathesis polymerisation (ROMP) reaction using a transition metal ROMP catalyst comprising the following formula:

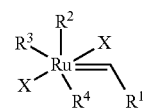

wherein:
R[1] is alkyl, aryl, alkylether, alkylthioether, arylether, arylthioether and in which, when R[1] contains an aryl component, the aryl component may be substituted;
R[2] is an N-heterocyclic carbene;
R[3] and R[4] are heterocyclic ligands which are capable of lone pair donation and which may the same or different, and
each X is an electron-withdrawing group which may the same or different and are selected from halogen, preferably chlorine, or hetero-substituted aromatic groups or hetero-substituted aliphatic groups such as aryloxy or alkoxy groups, especially phenoxy groups;
in the presence of a compound from which a heterocyclic ligand R[3] and R[4] may be derived by interaction with the catalyst; and
b) adding sufficient of an acyclic alkene having a carbon-carbon double bond capable of reacting with the catalytic metal moieties attached to the living end of each of the polymer chains generated in step a) to end cap the polymer chains and to generate an olefin metathesis transition metal catalyst.

It will be understood that, in this specification, the term ring-opening metathesis polymerisation includes the generation of oligomeric species as well as polymeric species.

In an embodiment according to the invention, the process comprises step c) removing polymer generated in the ROMP reaction from the reaction mixture.

In a preferred embodiment according to the invention, the process comprises step b)i) in which a further amount of said at least one cyclic alkene compound and/or of at least a second cyclic alkene compound is added to the reaction mixture and subjected to said ROMP reaction following which step b) is repeated. Optionally, step b)i) may be repeated at least once more; and in some embodiments many times more.

Thus, a preferred process according to the invention comprises steps a), b), b)i), optionally iterating step b)i) at least once and step c)

In preferred catalysts used in the process according to the invention, the group R1 is preferably aryl and more preferably unsubstituted aryl, more especially phenyl.

It is also preferred that R2 is a saturated N-heterocyclic carbene, more especially a saturated N-heterocyclic carbene of formula:

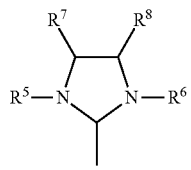

in which R5 and R6 are alkyl, aryl, alkylaryl or arylalkyl and may be the same or different and R7 and R8 are hydrogen or aryl, and may be the same or different and more especially are hydrogen. In most embodiments R5 and R6 are the same. It is especially preferred that R5 and R6 are each mesitylene, ie trimethylphenyl ((CH3)3C6H2-).

It is also preferred that R3 and R4 are N-heterocyclic ligands, more preferably substituted or non-substituted pyridine, especially halogen-substituted pyridine and most preferably 3-bromopyridine.

It is also preferred that each X is halogen, especially chlorine.

The compound from which a heterocyclic ligand R3 and R4 may be derived by interaction with the catalyst is a N-heterocyclic compound, more preferably is substituted or non-substituted pyridine, especially is a halogen-substituted pyridine and most preferably 3-bromopyridine. If desired, mixtures of such compounds may be utilised in the polymerisation process according to the invention.

In a particularly preferred embodiment of the invention, the polymerisation process utilises a catalyst of formula:

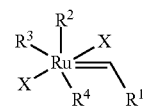

wherein:
R[1] is an unsubstituted phenyl;
R[2] is a saturated N-heterocyclic carbene of formula:

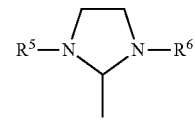

in which R[5] and R[6] are each mesitylene;
R[3] and R[4] are 3-bromopyridine ligands, and
each X is chlorine; and
the compound from which a heterocyclic ligand R[3] and R[4] may be derived by interaction with the catalyst is 3-bromopyridine.

The catalysts used in the process according to the present invention may be attached to a support such as a polymeric support, for example a PEG polymer, or a solid support either through the arylalkyl moiety or through one or more of the electron-donating groups and/or electron-withdrawing groups.

Specific examples of such catalysts are disclosed in the publications referred to earlier, which references are hereby incorporated herein by reference in their entirety.

In a preferred embodiment of the invention, the catalyst utilised by the process is formed in situ from a precursor compound which may itself be a metathesis catalyst. In a preferred embodiment, the precursor compound is a metathesis catalyst of formula:

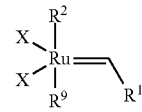

wherein:
R[1], R[2] and X are as hereinbefore defined; and
R[9] is an electron-donating group and is selected from PR[10]$_3$, wherein R[10] is alkyl, such as isopropyl, or is Cy wherein Cy is a cyclic aliphatic ring, preferably cyclohexyl.

The preferences for R1, R2 and X discussed previously apply mutatis mutandis to the precursor compound.

Preferably, R9 is PR103, wherein R10 is cyclohexyl.

The catalyst is formed in situ by the addition of the compound from which heterocyclic ligands R3 and R4 may be derived by interaction with the precursor compound. Preferably, the compound from which heterocyclic ligands R3 and R4 may be derived by interaction with the precursor compound is pyridine or 3-bromopyridine or mixtures thereof, most preferably 3-bromopyridine.

Preferably, the amount of compound from which a heterocyclic ligand R3 and R4 may be derived by interaction with the catalyst present in the process according to the invention is at least 1 molar equivalent relative to the amount of catalyst present, and more preferably is at least 5 molar equivalents. In one embodiment, the amount of compound from which a heterocyclic ligand R3 and R4 may be derived by interaction with the catalyst present in the process according to the invention is at least 10 molar equivalents, more particularly is at least 15 molar equivalents and especially is at least 20 molar equivalents.

Preferably, the amount of compound from which a heterocyclic ligand R3 and R4 may be derived by interaction with the catalyst present in the process according to the invention is not more than 120 molar equivalents relative to the amount of catalyst present, more preferably is not more than 100 molar equivalents, more particularly is not more than 80 molar equivalents, and especially is not more than 70 molar equivalents with not more than 60 molar equivalents being preferred.

Preferably, the amount of compound from which a heterocyclic ligand R3 and R4 may be derived by interaction with the catalyst present in the process according to the invention is in the range 1 to 120 molar equivalents relative to the amount of catalyst present, more preferably is in the range 5 to 100 molar equivalents, even more preferably is in the range 10 to 100 molar equivalents, more particularly is in the range 10 to 80 molar equivalents, and especially is in the range 15 to 70 molar equivalents with 20 to 60 molar equivalents being preferred.

Preferably, when the catalyst is formed in situ, the compound from which a heterocyclic ligand R3 and R4 may be derived by interaction with the catalyst is present in the process according to the invention in an amount which is in excess of the amount of catalyst present. Consequently, in this embodiment of the invention, the minimum amount of compound from which a heterocyclic ligand R3 and R4 may be derived by interaction with the catalyst present in the process according to the invention is at least 2 molar equivalents relative to the amount of catalyst present and more preferably is at least 5 molar equivalents. Otherwise, the amounts of the compound from which a heterocyclic ligand R3 and R4 may be derived by interaction with the catalyst is present in the process according to the invention are as described in the preceding paragraphs.

In an alternative embodiment of the present invention, the minimum amount of compound from which a heterocyclic ligand R3 and R4 may be derived by interaction with the catalyst present in the process according to the invention is at least 50 molar equivalents relative to the amount of catalyst present and more preferably is at least 55 molar equivalents. Otherwise, the amounts of the compound from which a heterocyclic ligand R3 and R4 may be derived by interaction with the catalyst is present in the process according to the invention are as described in the preceding paragraphs.

In this alternative embodiment of the present invention, the amount of compound from which a heterocyclic ligand R3 and R4 may be derived by interaction with the catalyst present in the process according to the invention is selected to generate a polymer having a desired molecular weight. As will be demonstrated in the Examples below, at higher levels of said amount of compound from which a heterocyclic ligand R3 and R4 may be derived by interaction with the catalyst present in the process according to the invention, the polymer generated has a molecular weight that is proportional to a target molecular weight determined by the monomer to catalyst ratio. In such reactions, a proportion of monomer remains in the reaction mixture. Clearly, in a process according to the invention utilising such reactions, both the polymer and the remaining monomer may be recovered, if desired; or the monomer may be utilised in a further ROMP reaction as described below.

The acyclic alkene used in step b) may have the double bond either at the end of the alkyl chain or between the ends. More preferably, the alkene has a terminal double bond. The alkyl chain is lower alkyl, for example between C2 and C12, preferably between C2 and C5. It may also have more than one double bond in the chain. Preferably, when the alkene is an arylalkene, the alkyl chain is a C2 chain. When the alkene is an arylalkene, the aryl ring is preferably a single ring, which may be substituted. Preferably, the ring is substituted in the ortho position with an alkoxy moiety, for example a C1 to C12 alkoxy moiety, especially an isopropoxy moiety. Examples of preferred alkenes are hex-3-ene, styrene or 2-isopropoxystyrene. Preferably, in step b), the alkene is an arylalkene selected from styrene or 2-isopropoxystyrene.

Preferably, in step b), the catalyst generated by the addition of the alkene is the same catalyst as used in step a).

Preferably, the amount of alkene used in step b) is at least 0.75 molar equivalent relative to the amount of catalyst present, more preferably at least 0.9 molar equivalent and more especially at least 1 molar equivalent. Preferably, the amount of alkene used in step b) is not more than 10 molar equivalents relative the amount of catalyst present, more preferably not more than 5 molar equivalents, and more especially not more than 3 molar equivalents. The preferred range of alkene used in step b) is between 0.75 and 10 molar equivalents relative the amount of catalyst present, more especially between 0.9 and 3 molar equivalents.

The process according to the invention is performed using a suitable solvent for the reactants and polymers formed. Typically, such solvents are tetrahydrofuran, toluene or benzene or are chlorinated solvents, for example dichloromethane, trichloromethane and dichloroethane.

Depending on the solvent used, the process of the invention may be carried out at temperatures in the range 10° C. to 100° C. However, it is particularly preferred that the process is carried out at room temperature, ie in the range 15° C. to 35° C., more particularly in the range 20° C. to 30° C. and especially about 23° C. to 25° C.

It will be appreciated that the reaction may be used to form copolymers, both random and block, by the addition of suitable precursor cyclic alkene compounds in step a) and/or in step b)i). For example, more than one precursor cyclic alkene compound may be added in step a) (or in step b)i)) and, subject to the relative rates of reaction of the compounds, random or block copolymers or copolymers having some block structure may be formed. Alternatively, a single precursor cyclic alkene compound may be added in step a) and one or more precursor cyclic alkene compounds may be added in step b)i) and vice versa.

It is also within the scope of the invention to make at least two homopolymers or copolymers within the same reaction mixture by the addition of appropriate monomers at steps a) and b)i), which homopolymers and/or copolymers will be intimately mixed and may form interpenetrating networks.

It is further within the scope of the invention to make polymers having different degrees of polymerisation by varying the monomer to catalyst ratios used in steps a) and b)i).

It is further within the scope of the invention to make larger quantities of polymers having a targeted degree of polymerisation and a good polydispersity by maintaining the monomer to catalyst ratios used in steps a) and b)i) but reiterating step b)i) a number of times.

In accordance with the process of the invention, step b)i) may be reiterated a number of times, typically 2, 3, 5 or 10 or even more times.

Polymerisation times using the process of the invention are typically under 1 hour, more usually around 30 minutes. The regeneration step b) is typically less than 15 minutes, more usually about 5 minutes but may be less, after which step b)i), whether the first step b)i) or a subsequent step b)i) on an iteration of b)i), may be implemented immediately.

As will be appreciated, the ability to reiterate the ROMP reaction has a number of advantages such as making specific copolymers and/or mixtures of homopolymers and/or copolymers and/or varying the degrees of polymerisation of polymers or parts thereof as discussed above, especially without the necessity of isolating such homopolymers and/or copolymers before reacting a second or further monomer. The ability to make such products as well as to make larger batches of a single product contributes very significantly to the cost effectiveness of the catalyst.

Once the required number of iterations has been made, the polymer(s) may be isolated by any conventional means such as precipitation from a non-solvent system for example methanol. The polymer may be isolated and the catalyst retained in solution to be used in a further polymerisation reaction according to the invention. Alternatively, the reaction may be completely terminated using an end-capping agent such as ethyl vinyl ether prior to isolation of the polymer.

The invention will now be further described by way of illustration only with reference to the following examples.

EXAMPLE 1

Under an inert atmosphere, a ring-opening metathesis catalyst of formula:

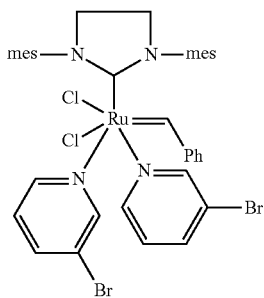

(mes=mesitylene, Ph=phenyl) (10 mg, 11.3 µmol) was dissolved in CDCl3 (0.6 ml). The solution was transferred to a Young's NMR tube and monitored using 1H NMR spectroscopy (using a Bruker Avance-400 and making the measurements at ambient temperature (about 295° K)) for 24 hours. No decomposition of the catalyst was observed during that period. Styrene (2.94 mg, 28.3 µmol-2.5 molar equivalents relative to the catalyst) dissolved in CDCl3 (0.1 ml) was then added to the catalyst solution. Continued monitoring of the solution by NMR showed that, after 1 hour, the catalyst had decomposed completely.

This showed the catalyst was unstable in the presence of styrene.

EXAMPLE 2

A ring-opening olefin metathesis polymerisation was carried out. Under an inert atmosphere, endo,exo-5,6-dicarbomethoxynorbornene (47.46 mg, 22.6 mmol, 20 molar equivalents relative to the catalyst) dissolved in CDCl3 (0.1 ml) was added to the catalyst used in Example 1 (10 mg, 11.3 mmol) dissolved in CDCl3 (0.6 ml). The reaction mixture was transferred to a Young's NMR tube. The system was monitored by 1H NMR spectroscopy until the monomer was totally consumed (disappearance of monomer vinyl resonances at 6.10 and 6.25 ppm).

After this time, (~30 minutes) styrene (1.18 mg, 11.3 mmol-1 molar equivalent relative to the catalyst) dissolved in CDCl3 (0.1 ml) was added to the solution. An extra 0.1 ml CDCl3 was added to the reaction mixture to ensure all the styrene had been added. The reaction was monitored by 1H NMR spectroscopy. The NMR spectroscopy results showed cross metathesis occurred between the living chain-end of the polymer chains and the styrene and led to the conversion of the propagating Ru moiety exclusively back to the catalyst of the formula shown in Example 1 and a chain-terminated polymer was present. After 30 minutes, NMR showed that all of the ruthenium alkylidene species present were in the form of regenerated catalyst; but, after 3 hours, the catalyst had decomposed substantially completely.

This showed that, although the catalyst could be regenerated, it was not stable at the level of styrene present.

EXAMPLE 3

Example 1 was repeated but 3-bromopyridine (5 molar equivalents relative to the catalyst) was added to the catalyst solution. Monitoring using 1H NMR spectroscopy for 1 hour demonstrated the catalyst was stable under those conditions. Following addition of the styrene (1 molar equivalent relative to the catalyst), monitoring using NMR showed that the catalyst slowly decomposed over time. The results are shown in Table 1. In the Table, the NMR data has been normalised by dividing each reading by the highest reading.

This demonstrates that the presence of the 3-bromopyridine significantly increases the stability of the catalyst in the presence of styrene.

TABLE 1

| Time (hours) | Amount of catalyst (normalised NMR data) |
|---|---|
| 1 (No styrene present) | 1 |
| Add styrene | |
| 1 | 0.76 |
| 2 | 0.78 |
| 22 | 0.18 |
| 25 | 0.14 |

EXAMPLE 4

A ring-opening olefin metathesis polymerisation was carried out. Under an inert atmosphere, endo,exo-5,6-dicarbomethoxynorbornene (47.46 mg, 22.6 µmol, 20 molar equivalents relative to the catalyst) dissolved in CDCl3 (0.1 ml) was added to the catalyst used in Example 1 (10 mg, 11.3 µmol) dissolved in CDCl3 (0.6 ml) together with 3-bromopyridine (8.93 mg, 56.5 μmol, 5 molar equivalents relative to the catalyst). The reaction mixture was transferred to a Young's NMR tube. The system was monitored by 1H NMR spectroscopy until the monomer was totally consumed (25 minutes) (disappearance of monomer vinyl resonances at 6.10 and 6.25 ppm). The reaction mixture was checked after 1.5, 3 and 19 hours and there was no change to it.

After this time, styrene (0.88 mg, 8.5 μmol-0.75 molar equivalents relative to the catalyst) dissolved in CDCl3 (0.1 ml) was added to the solution. An extra 0.1 ml CDCl3 was added to the reaction mixture to ensure all the styrene had been added. The NMR spectroscopy results showed the propagating Ru moiety was 77% regenerated back to the catalyst of the formula shown in Example 1 after 20 minutes and a chain-terminated polymer was present. Further checking by NMR at 1, 3, 6, 24 and 48 hours showed no further changes.

This showed that the catalyst had been regenerated and was stable, at least for that period of time, at the level of styrene present.

EXAMPLE 5

Example 4 was repeated using a monomer to catalyst molar equivalent ratio of 20:1, levels of 3-bromopyridine between 0.5 to 5 molar equivalents relative to the catalyst, a reaction time of 30 minutes and 1 molar equivalent of styrene relative to the catalyst. The results are given in Table 2. In Table 2, the NMR data has been normalised by dividing each reading by the highest reading which, in this Example, is the first reading following the addition of the styrene.

TABLE 2

| Amount of 3-bromopyridine Time (hours) | Amount of catalyst (normalised NMR data) | | | |
| --- | --- | --- | --- | --- |
| | 0.5 | 1 | 2.5 | 5 |
| 0.42 | 1 | | | |
| 0.5 | | 1 | | |
| 0.75 | 0.78 | | 1 | |
| 0.83 | | | | 1 |
| 1.25 | | | | |
| 2 | | 0.72 | | |
| 2.25 | | | 0.80 | |
| 3 | | | | 0.97 |
| 3.5 | 0.44 | | | |
| 4 | | 0.42 | 0.45 | |
| 5 | 0.23 | | | 0.94 |
| 10 | 0 | 0.13 | 0.37 | 0.73 |
| 20 | | 0.03 | 0.21 | 0.50 |

EXAMPLE 6

Example 5 was repeated using a monomer to catalyst molar equivalent ratio of 20:1 and 3-bromopyridine at 5 molar equivalents relative to the catalyst but varying the amount of styrene at levels of between 1 and 3 molar equivalents relative to the catalyst. The data for styrene at 1 molar equivalent was taken from Example 5. The results are given in Table 3. In Table 3, the NMR data has been normalised by dividing each reading by the highest reading which, in this Example, is the first reading following the addition of the styrene.

TABLE 3

| Amount of styrene Time (hours) | Amount of catalyst (normalised NMR data) | | | |
| --- | --- | --- | --- | --- |
| | 1 | 1.5 | 2 | 3 |
| 0.33 | | 1 | | |
| 0.5 | | | 1 | 1 |
| 0.83 | 1 | | | |
| 1.5 | | 0.96 | 0.99 | 0.95 |
| 2.5 | | 0.86 | 0.89 | |
| 3 | 0.97 | | | |
| 5 | 0.94 | | | |
| 5.5 | | | | 0.69 |
| 6 | | 0.73 | 0.53 | |
| 6.5 | | | | 0.28 |
| 9 | | 0.59 | 0.38 | |
| 10 | 0.73 | | | |
| 20 | 0.5 | 0.33 | 0.18 | 0.09 |

EXAMPLE 7

Example 5 was repeated using exo-benzyl dicarboxyimide norbornene as the monomer, a monomer to catalyst ratio of 20:1, 5 molar equivalents relative to the catalyst of 3-bromopyridine and 1 molar equivalent relative to the catalyst of styrene. The results are given in Table 4. In Table 4, the NMR data has been normalised by dividing each reading by the highest reading which, in this Example, is the first reading following the addition of the styrene.

EXAMPLE 8

Example 5 was repeated using a monomer to catalyst ratio of 20:1, pyridine (5 molar equivalents relative to the catalyst) instead of 3-bromopyridine and 1 molar equivalent relative to the catalyst of styrene. The results are given in Table 5. In Table 5, the NMR data has been normalised by dividing each reading by the highest reading which, in this Example, is the first reading following the addition of the styrene.

TABLE 4

| Time (hours) | Amount of catalyst (normalised NMR data) |
| --- | --- |
| 1 | 1 |
| 3 | 1 |
| 4 | 1.1 |
| 20 | 0.46 |

TABLE 5

| Time (hours) | Amount of catalyst (normalised NMR data) |
| --- | --- |
| 1.5 | 1 |
| 3 | 1 |
| 4 | 0.90 |
| 13 | 0.90 |
| 20 | 0.70 |
| 25 | 0.80 |
| 33 | 0.60 |
| 46 | 0.60 |

EXAMPLE 9

Example 8 was repeated using a catalyst as shown in Example 1 except that the 3-bromopyridine ligands were pyridine ligands and using a monomer to catalyst ratio of 20:1. The results are given in Table 6. In Table 6, the NMR data has been normalised by dividing each reading by the highest reading which, in this Example, is the first reading following the addition of the styrene.

TABLE 6

| Time (hours) | Amount of catalyst (normalised NMR data) |
|---|---|
| 1.5 | 1 |
| 3 | 1 |
| 4 | 1 |
| 20 | 0.83 |
| 25 | 0.79 |
| 32 | 0.73 |
| 46 | 0.54 |

EXAMPLE 10

Example 5 was repeated but using a monomer to catalyst ratio of 25:1, 5 molar equivalents relative to the catalyst of 3-bromopyridine and 1 molar equivalent relative to the catalyst of styrene.

When the polymerisation was complete (after 30 minutes), the styrene was added to regenerate the catalyst. When the catalyst was regenerated (after 5 minutes), the ROMP reaction was terminated by adding excess ethyl vinyl ether following which the polymer was isolated by precipitation into cold methanol, filtered and being dried under vacuum for 24 hours. The isolated polymer was subjected to gel permeation chromatography (GPC) using a Viscotek 302 Trisec with triple detectors (RI, viscometry and light scattering in tetrahydrofuran using mixed Plgel columns to determine the number average molecular weight (Mn) and the weight average molecular weight (Mw) of it and enable its polydispersity index (PDI) (Mw/Mn) to be calculated.

This polymerisation process and product analysis was repeated except that, prior to adding excess ethyl vinyl ether to terminate the ROMP reaction, the ROMP reaction was performed over 3 cycles by respectively adding, after the initial ROMP reaction and catalyst regeneration, second and third amounts of monomer (at a monomer to catalyst ratio of 25:1) and second and third amounts of styrene (1 molar equivalent relative to the catalyst). In other words, the sequence and timing of the process was:
  add monomer, 3-bromopyridine and catalyst and react over 30 minutes
    add styrene and regenerate for 5 minutes
    add second quantity of monomer and react over 30 minutes
    add second amount of styrene and regenerate for 5 minutes
    add third quantity of monomer and react over 30 minutes
    add third quantity of styrene and regenerate for 5 minutes
    add ethyl vinyl ether.

The polymerisation process was then repeated a further twice to establish polymerisations over 5 and 10 cycles respectively.

The results of the GPC analysis are given in Table 6.

TABLE 6

| No of Cycles | Mn | Mw | PDI |
|---|---|---|---|
| 1 | 5260 | 5530 | 1.05 |
| 3 | 7600 | 8690 | 1.14 |

TABLE 6-continued

| No of Cycles | Mn | Mw | PDI |
|---|---|---|---|
| 5 | 6180 | 7960 | 1.29 |
| 10 | 6250 | 8990 | 1.37 |

The target Mn for each cycle was 5000, as determined by the monomer to catalyst molar equivalent ratio of 25:1, ie a target degree of polymerisation of 25. The Mn of the polymers generated both over one cycle and over multiple cycles was in good agreement with the target Mn. A narrow PDI was also achieved together with unimodal distribution of the molecular weight as determined by GPC. In the absence of catalyst regeneration as achieved by the present invention over multiple cycles, the Mn of the polymers would have been anticipated as being for 3 cycles about 15000, for 5 cycles about 25000 and for 10 cycles about 50000.

EXAMPLE 11

Using reagents as received without further purification and under standard laboratory conditions, ring-opening olefin metathesis polymerisations were carried out as described below.
Polymerisations 1 and 2
  Under an inert atmosphere, the catalyst as used in Example 1 (100 mg and 760 mg, respectively) was dissolved in CDCl3 (5 ml) following which exo-2-ethylhexyl-imidonorbornene (2365 mg, 8600 μmol) was added and the reaction mixture was stirred for 1 hour at room temperature. The reaction was terminated by the addition of excess ethyl vinyl ether (0.5 ml). The reaction mixture was allowed to stir for a further 10 minutes prior to sampling for GPC analysis. The polymer was then isolated by precipitation into cold methanol, filtered and being dried under vacuum for 24 hours.
Polymerisation 3
  Polymerisation 3 was a repeat of polymerisations 1 and 2 except that the catalyst (730 mg) had the following formula (X):

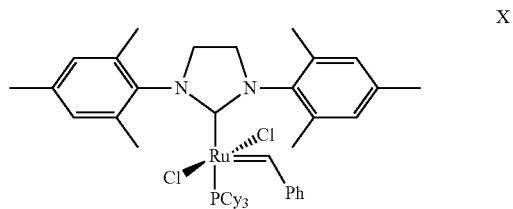

Polymerisations 4 to 10
  Under an inert atmosphere, the catalyst as used in polymerisation 3 of this Example 11 (730 mg, 86 μmol) was dissolved in CDCl3 (5 ml) following which 3-bromopyridine was added and the mixture was stirred at room temperature for 2 hours. Exo-2-ethylhexyl-imidonorbornene (2365 mg, 8600 μmol) in chloroform (35 ml) was added and the reaction mixture was stirred for 1 hour at room temperature. The reaction was terminated by the addition of excess ethyl vinyl ether (0.5 ml). The reaction mixture was allowed to stir for a further 10 minutes. The polymer was then isolated by precipitation into cold methanol, filtered and being dried under vacuum for 24 hours.

The details of the polymerisations are given in Table 8 and the GPC analysis results are given in Table 9.

The GPC results were obtained by dissolving the sample in chloroform and analysed using 3*30 cm Plgel GPC columns (100 Å, 1000 Å and 10000 Å), which columns covered the molecular weight range from 100 to approximately 600000 daltons. Other analysis conditions were:

| Temperature | 45° C. |
|---|---|
| Detector | RI |

TABLE 8

| | | | Catalysts and Ligands | | |
|---|---|---|---|---|---|
| Poly-merisation | M:C | L:C | As in Example 1 | As Formula X | 3-bromo-pyridine |
| 1 | 76:1 | | 0.100 g | | |
| 2 | 100:1 | | 0.076 g | | |
| 3 | 100:1 | | | 0.073 g | |
| 4 | 100:1 | 20:1 | | 0.073 g | 0.272 g/0.166 ml |
| 5 | 100:1 | 50:1 | | 0.073 g | 0.680 g/0.415 ml |
| 6 | 100:1 | 60:1 | | 0.073 g | 0.816 g/0.498 ml |
| 7 | 100:1 | 80:1 | | 0.073 g | 1.088 g/0.664 ml |
| 8 | 100:1 | 100:1 | | 0.073 g | 1.360 g/0.8630 ml |
| 9 | 100:1 | 150:1 | | 0.073 g | 2.040 g/1.245 ml |
| 10 | 100:1 | 200:1 | | 0.073 g | 2.720 g/1.660 ml |

In this Table 8, M:C = Monomer to Catalyst ratio; L:C = Ligand (ie 3-bromopyridine) to catalyst ratio.

TABLE 9

| Polymerisation | Calculated Mn | Mn | Mw | PDI |
|---|---|---|---|---|
| 1 | 20900 | 20300 | 26310 | 1.30 |
| 2 | 27500 | 29950 | 71350 | 2.38 |
| 3 | 27500 | 185540 | 614390 | 3.31 |
| 4 | 27500 | 26410 | 31720 | 1.20 |
| 5 | 27500 | 26450 | 29580 | 1.12 |
| 6 | 27500 | 28115 | 29990 | 1.067 |
| 7 | 27500 | 22750 | 24050 | 1.057 |
| 8 | 27500 | 22340 | 23680 | 1.060 |
| 9 | 27500 | 15480 | 16370 | 1.057 |
| 10 | 27500 | 13380 | 14470 | 1.082 |

| Flow | 0.75 ml/min |
|---|---|
| Instrument | Viscotek GPC Max TDA |
| Loop | 100 µl |
| Eluent | Chloroform |

The GPC analysis of the molecular weights of the reaction products showed that, at levels of 3-bromopyridine greater than 50 molar equivalents, ie Samples 6 to 10, a bimodal distribution of molecular weights is present derived from unreacted monomer and polymer. Consequently, as the level of the 3-bromopyridine is increased, the molecular weight of the polymer obtained falls relative to the target molecular weight. However, it does so in an apparently predictable manner. Thus, variation of the levels of 3-bromopyridine may be used to vary the molecular weight of the polymer obtained relative to a target molecular weight. It will also be apparent that both polymer and monomer may be recovered from the reaction mixture. Alternatively, in a multiple-cycle process, the amount of additional monomer added at each cycle may be adjusted to accommodate the amount of monomer remaining in the reaction mixture.

EXAMPLE 12

A first ROMP reaction was carried out as follows (Polymerisation 11).

Under an inert atmosphere, the catalyst as used in polymerisation 1 of Example 11 (10 mg) was dissolved in CDCl3 (5 ml) together with 3-bromopyridine (68 mg) (50 molar equivalents relative to the catalyst) following which exo-2-ethylhexyl-imidonorbornene (236.5 mg) (76 molar equivalents relative to the catalyst) in chloroform (35 ml) was added. The reaction mixture was stirred for 30 minutes at room temperature. Styrene (1 mg) (1 molar equivalent relative to the catalyst) was then added to the reaction mixture which was stirred for a further 10 minutes to regenerate the catalyst. A further amount of the monomer (236.5 mg) was then added to the reaction mixture to be polymerised. The process was repeated to achieve 7 cycles of polymerisation and, following the 7th cycle, no styrene was added but the reaction was terminated by the addition of excess ethyl vinyl ether (100 mg). The reaction mixture was allowed to stir for a further 10 minutes prior to sampling for GPC analysis. The polymer was then isolated by precipitation into cold methanol, filtered and being dried under vacuum for 24 hours.

A second ROMP reaction was carried out as follows (Polymerisation 12).

Under an inert atmosphere, the catalyst of formula X as used in polymerisations 3 to 10 of Example 11 (100 mg) was dissolved in CDCl3 (5 ml) following which 3-bromopyridine (680 mg) (50 molar equivalents relative to the catalyst) was added and the mixture was stirred at room temperature for 2 hours. Exo-2-ethylhexyl-imidonorbornene (2365 mg) (100 molar equivalents relative to the catalyst) in chloroform (35 ml) was added and the reaction mixture was stirred for 1 hour at room temperature. Styrene (10 mg) (1 molar equivalent relative to the catalyst) was then added to the reaction mixture which was stirred for a further 10 minutes to regenerate the catalyst. A further amount of the monomer (2365 mg) was then added to the reaction mixture to be polymerised. The process was repeated to achieve 3 cycles of polymerisation and, following the 3rd cycle, no styrene was added but the reaction was terminated by the addition of excess ethyl vinyl ether (500 mg). The reaction mixture was allowed to stir for a further 10 minutes prior to sampling for GPC analysis. The polymer was then isolated by precipitation into cold methanol, filtered and being dried under vacuum for 24 hours.

The GPC results are given in Table 10.

TABLE 10

| Polymerisation | Calculated Mn | Mn | Mw | PDI |
|---|---|---|---|---|
| 11 | 20900 | 20120 | 36960 | 1.84 |
| 12 | 27500 | 30810 | 46680 | 1.52 |

The GPC analysis of the molecular weights of the reaction products showed only unimodal GPC traces of the polymer molecular weights indicative of 100% conversion of the monomers to polymers. This was achieved by the regenerated catalyst. In the absence of regeneration of the catalyst, molecular weights of about 146000 (Polymerisation 11) and 83000 (Polymerisation 12) would be expected.

We claim:
1. A polymerisation process comprising:
   a) subjecting at least one cyclic alkene compound to a ring-opening metathesis polymerisation (ROMP) reac- tion using a transition metal ROMP catalyst comprising the following formula:

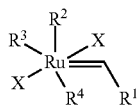

wherein:
R$^1$ is alkyl, aryl, alkylether, alkylthioether, arylether, arylthioether and in which, when R$^1$ contains an aryl component, the aryl component may be substituted;
R$^2$ is an N-heterocyclic carbene;
R$^3$ and R$^4$ are heterocyclic ligands [which are capable of lone pair donation and] which may be the same or different, and
each X is an electron-withdrawing group which may be the same or different and is selected from halogen, hetero-substituted aromatic groups and hetero-substituted aliphatic groups;
in the presence of a compound from which a heterocyclic ligand R$^3$ and R$^4$ may be derived by interaction with the catalyst;
b) adding sufficient of an acyclic alkene having a carbon-carbon double bond capable of reacting with the catalytic metal moieties attached to the living end of each of the polymer chains generated in step a) to end cap the polymer chains and to generate an olefin metathesis transition metal catalyst; and
c) optionally repeating steps a) and b).

2. The process according to claim 1 wherein the catalyst is of formula:

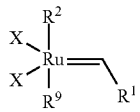

wherein:
R$^1$ is an unsubstituted phenyl;
R$^2$ is a saturated N-heterocyclic carbene of formula:

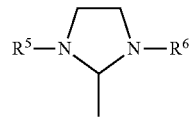

in which R$^5$ and R$^6$ are each mesitylene;
R$^3$ and R$^4$ are 3-bromopyridine ligands, and
each X is chlorine; and
the compound from which a heterocyclic ligand R$^3$ and R$^4$ may be derived by interaction with the catalyst is 3-bromopyridine.

3. The process according to claim 1 comprising forming the catalyst in situ from a precursor compound that is a metathesis catalyst of formula:

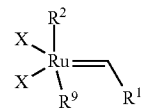

wherein:
R$^1$, R$^2$ and X are as hereinbefore defined; and
R$^9$ is an electron-donating group and is selected from PR$^{10}_3$, wherein R$^{10}$ is alkyl or is Cy wherein Cy is a cyclic aliphatic ring.

4. The process according to claim 1 comprising forming the catalyst in situ by the addition of a compound from which a heterocyclic ligand R$^3$ and R$^4$ may be derived by interaction with the precursor compound.

5. The process according to claim 4 wherein the compound is present in an amount 20 to 60 molar equivalents relative to the amount of catalyst present in the reaction mixture.

6. A process according to claim 1 in which the acyclic alkene is selected from styrene or 2-isopropoxystyrene.

7. The process according to claim 6 in which the amount of acyclic alkene is between 0.9 and 3 molar equivalents relative to the amount of catalyst present.

* * * * *